Day & Noel,
Cotton Press.
N° 52,786.      Patented Feb. 20, 1866.
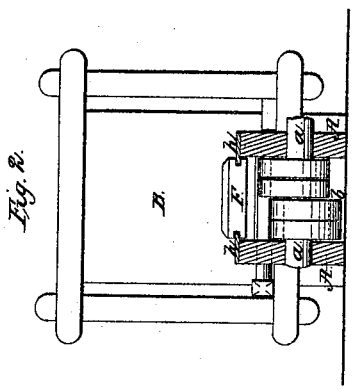
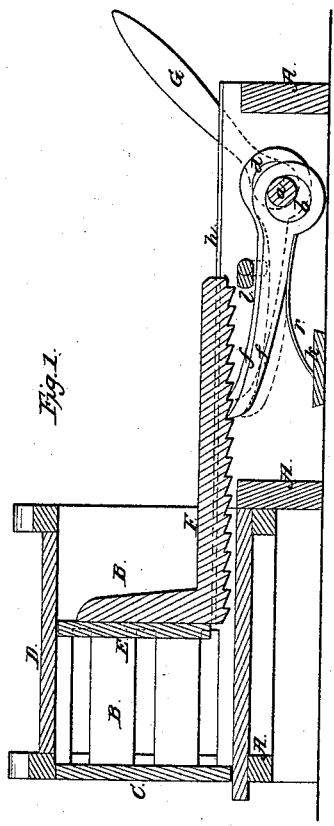
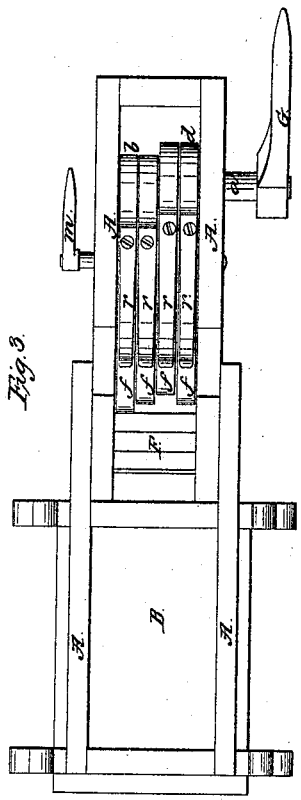
Witnesses:
J. W. Coombs
A. Leclerc
Inventor:
E. M. Day
J. F. Noel
per Brown, Coombs & Co.
Attorneys.

UNITED STATES PATENT OFFICE.

ERASTUS M. DAY AND JOHN T. NOEL, OF LOWER LAKE, CALIFORNIA, ASSIGNORS TO H. WINCHESTER AND E. M. DAY, OF SAME PLACE.

IMPROVEMENT IN HAY AND COTTON PRESSES.

Specification forming part of Letters Patent No. 52,786, dated February 20, 1866.

*To all whom it may concern:*

Be it known that we, ERASTUS M. DAY and JOHN T. NOEL, both of Lower Lake, in the county of Lake and State of California, have invented certain new and useful Improvements in Presses for Baling Cotton, Hay, and other Substances; and we do hereby declare the following to be a full, clear, and exact description of the same, reference being had to the annexed drawings, making a part of this specification, in which—

Figure 1 is a longitudinal vertical section taken through the center of the press. Fig. 2 is a transverse vertical section taken in the line $x\ x$ of Fig. 1. Fig. 3 is an inverted plan view.

Similar letters of reference indicate similar parts in all the figures.

This invention relates to that class of presses known as "ratchet-presses," and used for compressing cotton, hay, and other like substances into bales; and it consists in certain novel arrangements of parts whereby the ratchet-teeth, with the pawls and their operating eccentrics, are protected from waste and dirt. The ratchet-bar may be worked by either a long or short stroke of the operating-lever, and the follower and ratchet-bar may be easily moved back after the bale is pressed, and by which the several parts of the machine are brought into such relation with each other as to materially increase the efficiency and convenience of operating this class of presses.

To enable others skilled in the art to understand the construction and operation of our invention, we will proceed to describe it with reference to the drawings.

A is the bed or foundation of the press, upon one end of which is the box B, in which the material to be pressed is placed. The front end of this box is provided with a gate, C, so that by opening the same the pressed bale may be removed from the box. The cover or top D is also removable, in order to allow the material to be put into the box, and is confined in place during the operation of pressing by any suitable means.

E is the follower, arranged vertically and attached to the forward end of the horizontal ratchet-bar F at right angles thereto. This said bar has the ratchet inverted—that is to say, the teeth are formed upon its under side—and is fitted at its edges between suitable guides, $h$, to slide to and fro upon the bed. Near the rear end of the bed A, and between the planks that form the same, are the pawls $f$, which act upon the ratchet-bar to operate the follower. These pawls are attached to eccentrics $b$ and $d$, which are secured upon a rock-shaft, $a$, extending across the bed A and pivoted therein, and furnished at one end with an operating-lever, G. There are two of the pawls $f$ upon each eccentric, one pawl of each pair being half the length of a ratchet-tooth shorter than the other, in order that each may act alternately with the other upon the ratchet-teeth, and thus move the ratchet-bar forward half the length of a tooth at each forward stroke of the operating-lever G, as will be presently explained. Each of the pawls $f$ is pressed upward and has its point kept in contact with the ratchet-bar by a spring, $r$, attached to its under side, and having its outer end curved downward and resting upon a cross-bar, $k$, at the bottom of the bed A. A rocking motion being given to the lever G, the eccentrics upon the rock-shaft $a$ cause the pawls to move forward and back, the forward movement of one pair of pawls being alternate with that of the other pair.

The points or forward ends of the pawls, as they are moved forward, acting upon the teeth of the ratchet-bar, push it forward with the follower attached thereto, thus decreasing the space between the said follower and the end C and compressing the material placed therein. But one pawl of each pair acts upon the ratchet-bar at the same time, two pawls being placed upon each eccentric, in order that one or the other may catch against a tooth of the ratchet-bar when the lever G is moved back but half the distance necessary to bring a pawl back the whole length of a tooth, inasmuch as one pawl of each pair is half the length of a ratchet-tooth shorter than the other, as hereinbefore set forth. By this means the press may be worked by moving the lever G only one-half the distance required if but one pawl were used for each eccentric.

After a bale has been pressed it is necessary to move the follower E back to the rear end of the box B in order to press the succeeding bale. To do this the pawls $f$ are brought out of contact with the ratchet-bar by means of the cam $l$, the journals of which are pivoted transversely in the bed A, just above the pawls, in such a way that when in the position shown in Fig. 1 it will allow the pawls to act upon the ratchet-bar, as just set forth; but when turned so that its greatest length will be vertical, as shown in outline in the same figure, it will press the points of the pawls downward away from the ratchet-bar, and thus allow the said bar to be brought back to the rear end of the frame with the follower at the rear end of the box, as aforesaid. The cam $l$ is operated by a short lever, $m$, attached to one of its journals at one side of the bed A.

Such being the construction of our invention, its operation is simply as follows: The gate G is closed and the top D removed. The cotton, hay, or other material to be pressed is put into the box and the top replaced thereon and securely fastened down. The lever G is then worked to and fro, which, operating the pawls, as hereinbefore fully set forth, moves the ratchet-bar and follower forward, thus compressing the material inclosed in the box into a bale. When this is done the gate C is opened, the follower is worked farther forward by continuing the motion of the lever C, and the bale is pushed out at the front end of the box B.

What we claim as our invention, and desire to secure by Letters Patent, is—

1. The arrangement, in a ratchet-press, of the inverted ratchet-bar, rock-shaft, eccentrics and pawls, substantially as and for the purpose herein specified, whereby the ratchet-bar is made to serve as a shield for the protection of the ratchet-teeth, pawls, and eccentrics from waste and dirt.

2. In a ratchet-press having the ratchet-pawls worked by eccentrics on a rock-shaft, the pawls, two for each eccentric, arranged in relation to the ratchet-teeth, substantially as herein described, whereby the operation of the ratchet-bar, by a longer or shorter stroke of the lever by which the rock-shaft is worked, is provided for.

3. The disengaging-cam and its supporting-shaft, arranged in relation to the bed of the press, the ratchet-bar and pawls, substantially as and for the purpose herein specified.

4. The arrangement of the follower, its attached ratchet-bar, the rock-shaft, eccentrics, pawls, operating-lever, and disengaging-cam in relation to each other and to the bed or foundation of the press, substantially as herein specified.

ERASTUS M. DAY.
JOHN T. NOEL.

Witnesses:
W. R. MATHEWS,
L. B. THURMAN.